US009536471B2

(12) United States Patent
Moon

(10) Patent No.: US 9,536,471 B2
(45) Date of Patent: Jan. 3, 2017

(54) DISPLAY DEVICE AND POWER CONSUMPTION REDUCTION METHOD

(71) Applicant: Samsung Display Co., Ltd., Yongin (KR)

(72) Inventor: Kyung-Hwan Moon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 179 days.

(21) Appl. No.: 14/248,060

(22) Filed: Apr. 8, 2014

(65) Prior Publication Data

US 2015/0009200 A1 Jan. 8, 2015

(30) Foreign Application Priority Data

Jul. 5, 2013 (KR) ........................ 10-2013-0079282

(51) Int. Cl.
*G06F 3/038* (2013.01)
*G09G 3/32* (2016.01)

(52) U.S. Cl.
CPC .... *G09G 3/3233* (2013.01); *G09G 2310/0213* (2013.01); *G09G 2330/021* (2013.01); *G09G 2330/022* (2013.01)

(58) Field of Classification Search
CPC ............ G09G 3/3233; G09G 2330/022; G09G 2330/021; G09G 2310/0213
See application file for complete search history.

(56) References Cited

U.S. PATENT DOCUMENTS 6,130,657 A 10/2000 Kurokawa et al.
2005/0064829 A1* 3/2005 Kang .................. H04W 52/028 455/127.1
2007/0001937 A1* 1/2007 Park ..................... G09G 3/3233 345/76
2011/0028186 A1* 2/2011 Lee ....................... G06F 3/0486 455/566
2012/0182273 A1* 7/2012 Ninomiya ............. G06F 3/1431 345/204

(Continued)

FOREIGN PATENT DOCUMENTS

KR 10-1998-0071137 10/1998
KR 10-2006-0050077 5/2006

(Continued)

*Primary Examiner* — Kent Chang
*Assistant Examiner* — Gerald Oliver
(74) *Attorney, Agent, or Firm* — H.C. Park & Associates, PLC

(57) ABSTRACT

The present invention relates to a display device and a method of operating the display device that reduces power consumption, the method including: operating the display device in a normal driving mode to display an image on a display panel according to an image data signal; operating the display device in a sleep mode, by adjusting a clock signal and an image data signal transmitted from a set controller to of the display device to a first voltage; measuring a sleep mode time period during which the display device operates in the sleep mode; and adjusting a register value of the set controller when the measured sleep mode time period exceeds a first reference time period and maintaining the clock signal at a second voltage according to the adjusted register value as a clock-off mode.

12 Claims, 11 Drawing Sheets

(56) References Cited

U.S. PATENT DOCUMENTS

| | | | | |
|---|---|---|---|---|
| 2012/0288139 | A1* | 11/2012 | Singhar | G06F 1/3265<br>382/103 |
| 2013/0054998 | A1* | 2/2013 | Wyatt | G06F 1/3265<br>713/323 |
| 2013/0113759 | A1* | 5/2013 | Gu | G06F 3/0416<br>345/175 |

FOREIGN PATENT DOCUMENTS

| | | |
|---|---|---|
| KR | 10-2011-0099411 | 9/2011 |
| KR | 10-2012-0032888 | 4/2012 |

* cited by examiner

FIG. 7

| REGISTER | ADDRESS |
|---|---|
| ⋮ | ⋮ |
| DSIM_CLKCTR | OXFA50_0008 |
| ⋮ | ⋮ |
| DSIM_PLLCTR | OXIA50_004C |
| ⋮ | ⋮ |

FIG. 8

| DSIM_CLK_CTR | Bit | imitial state |
|---|---|---|
| ⋮ | ⋮ | ⋮ |
| ByteCLKEn | [24] | 0 |
| ⋮ | ⋮ | ⋮ |

FIG. 9

| DSIM_PLL_CTR | Bit | imitial state |
|---|---|---|
| ⋮ | ⋮ | ⋮ |
| pllEn | [23] | 0 |
| ⋮ | ⋮ | ⋮ |

DISPLAY DEVICE AND POWER CONSUMPTION REDUCTION METHOD

CROSS-REFERENCE TO RELATED APPLICATION

This application claims priority to and the benefit of Korean Patent Application No. 10-2013-0079282, filed on Jul. 5, 2013, which is hereby incorporated by reference for all purposes as if fully set forth herein.

BACKGROUND

Field

Exemplary embodiments of the present invention relate to a technique for reducing power consumption of an active matrix organic light emitting diode (AMOLED) display device in a sleep mode.

Discussion of the Background

In general, a power consumption reducing method according to a driving voltage change and a luminance change is conventionally used in order to reduce power consumption of an AMOLED display device. Particularly, most conventional methods for reducing power consumption reduce it in a driving state (normal mode) of the AMOLED display device. A limited number of methods deal with techniques for reducing the power consumption in a sleep mode thereof.

Conventionally, a deep sleep mode (ultra-low power state, ULPS) method is employed as a function for reducing the power consumption in the sleep mode state of the AMOLED display device. This method, however, has limited application fields and requires an additional resistor configuration and process to enter the deep sleep mode.

When a conventional set controller including the AMOLED display device enters the sleep mode, most power blocks and a phase-locked loop (PLL) of the set controller are turned off and only an operator and some I/O pins are limitedly used.

However, in a case of a display serial interface (DSI) through which the set controller and a display module are connected to each other, even when entering the sleep mode, the DSI is not completely turned off and a current ranging from several tens to several hundreds of microamperes (μA) is consumed in a driver IC.

As a result, when the sleep mode is maintained, necessary power is consumed in the driver IC.

The above information disclosed in this Background section is only for enhancement of understanding of the background of the invention and therefore it may contain information that does not form the prior art that is already known in this country to a person of ordinary skill in the art.

BRIEF SUMMARY OF THE INVENTION

Exemplary embodiments of the present invention provide a display device having advantages of minimizing its power consumption in a sleep mode thereof by more efficiently managing a clock signal through control of an oscillator register.

Exemplary embodiments of the present invention provide a display device having advantages of improving power consumption efficiency in a continuous sleep mode thereof by turning an oscillator of a set controller off to reduce its power consumption and adaptably changing a power saving mode in a sleep mode state thereof according to its continuous time period.

Additional features of the invention will be set forth in the description which follows, and in part will be apparent from the description, or may be learned by practice of the invention.

An exemplary embodiment of the present invention provides a method of reducing power consumption in a display device comprising a display panel and a set controller, the method including: operating the set controller according to a normal driving mode to display an image on the display panel; operating the set controller in a sleep mode when a sleep mode command is received, by maintaining a clock signal and an image data signal transmitted by the controller to the display device, at a first voltage; measuring a sleep mode time period during which the controller operates in the sleep mode; and operating the set controller in a clock-off mode when measured sleep mode time period exceeds a first reference time period, by adjusting the clock signal to a second voltage, while maintaining the image data signal at the first voltage.

Another exemplary embodiment of the present invention provides a power-consumption reducing display device, including: a set controller configured to selectively operate in a sleep mode, a clock-off mode, and a deep sleep mode, by adjusting voltages applied to a clock lane and a data lane; a signal controller configured to generate an image data signal; a data driver configured to receive the image data signal and generate a data voltage corresponding to the image data signal, in response to a gate signal; and a display panel configured to receive the data voltage and display a corresponding image. The set controller may include: an oscillator configured to transmit a clock signal to the signal controller; a register configured to control the oscillator; and a CPU configured to adjust the register value according to the mode of the set controller to control the oscillator.

In accordance with the exemplary embodiments of the present invention, a display device and a method of reducing power consumption in a sleep mode, capable of efficiently managing clock signals and minimizing power consumption caused by activating the clock signals, are provided.

It is to be understood that both the foregoing general description and the following detailed description are exemplary and explanatory and are intended to provide further explanation of the invention as claimed.

BRIEF DESCRIPTION OF THE DRAWINGS

FIG. 7 shows a register map in accordance with an exemplary embodiment of the present invention.

FIG. 8 shows a clock control register in accordance with an exemplary embodiment of the present invention.

FIG. 9 shows a PLL control register in accordance with an exemplary embodiment of the present invention.

DETAILED DESCRIPTION OF THE ILLUSTRATED EMBODIMENTS

Figure 1:
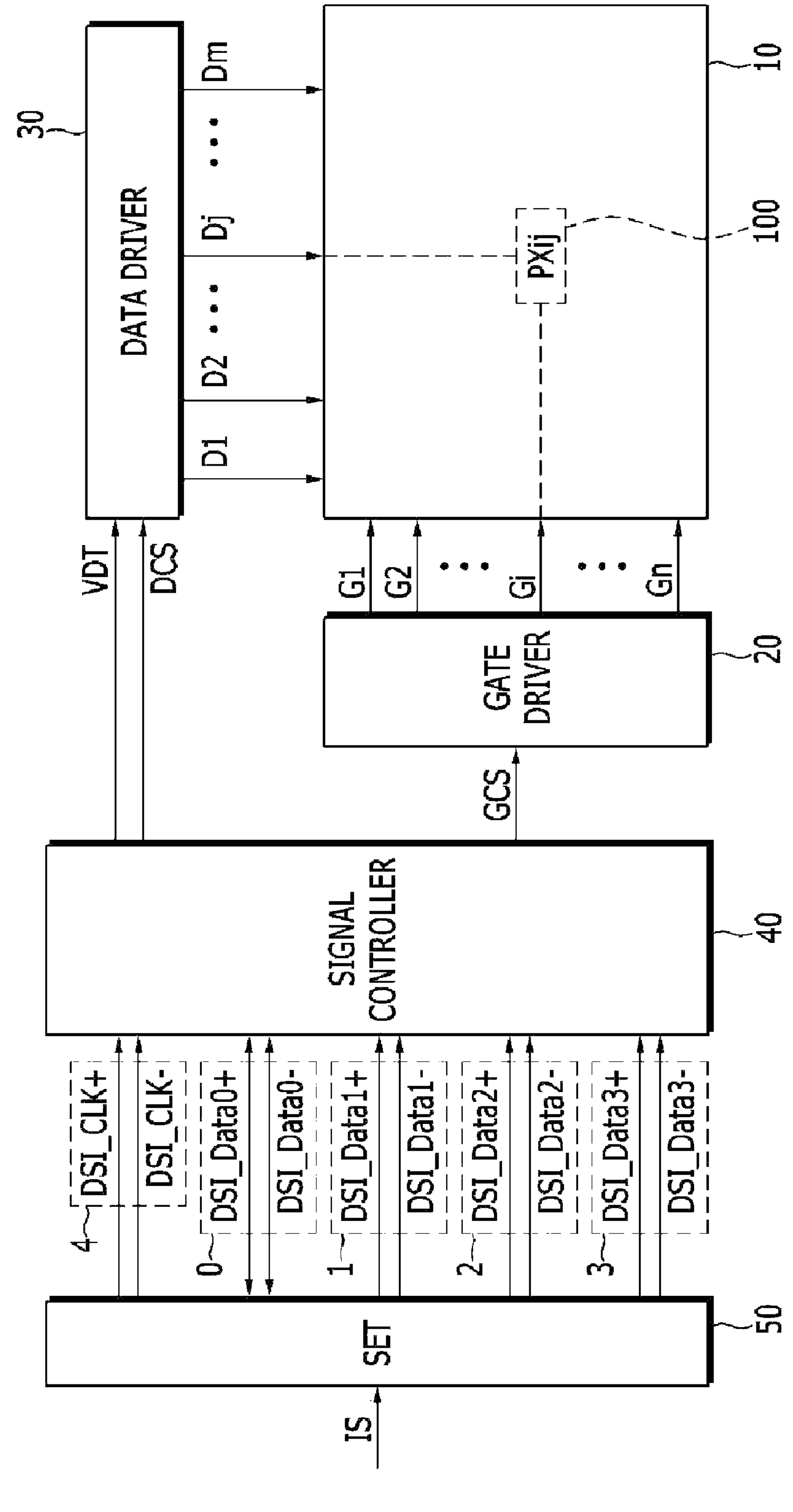
FIG. 1 shows a display device in accordance with an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings and this specification, parts or elements that are not related to the description hereof are omitted in order to clearly describe the present invention, and the same or like constituent elements are designated by the same reference numerals throughout the specification.

Throughout this specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 shows a display device in accordance with an exemplary embodiment of the present invention. Referring to FIG. 1, the display device in accordance with the exemplary embodiment of the present invention includes a display panel 10 configured to include a plurality of pixels 100, a gate driver 20, a data driver 30, a signal controller 40, and a set controller 50 configured to control the signal controller 40.

The display panel 10 includes the pixels 100 disposed between gate lines G1 to Gn and data lines D1 to Dm. Each of the pixels 100 is connected to a corresponding one of the gate lines G1 to Gn and a corresponding one of the data lines D1 to Dm. The pixels 100 are arranged in a matrix. The gate lines G1 to Gn may extend substantially in a row direction of the pixels and are parallel with each other. The data lines D1 to Dm may extend substantially in a column direction of the pixels and are parallel with each other.

The set controller 50 controls the signal controller 40, and determines a mode command and generates image data DATA according to an image source IS supplied from the outside, during a normal driving mode for displaying an output image on the display panel, according to an output image data signal VDT. In a power saving mode, the set controller 50 generates the image data DATA and clock signals CLK according to three modes (sleep mode, clock-off mode, and deep sleep mode) defined by a register.

Four data lanes 0 to 3 and a one clock lane 4 are formed between the set controller 50 and the signal controller 40. In the present exemplary embodiment, each lane includes a pair of lines through which differential signals having positive and negative signals are transmitted.

As a result, 10 lines are formed between the set controller 50 and the signal controller 40 in the present exemplary embodiment. This, however, is merely an example, and the present exemplary embodiment is not limited thereto.

The set controller 50 maintains the sleep mode, the clock-off mode, or the deep sleep mode by adjusting a voltage of a clock lane 4 (DSI_CLK+, DSI_CLK−) or data lanes 0, 1, 2, 3 (DSI_DATA0+, DSI_DATA0−, DSI_DATA1+, DSI_DATA1−, DSI_DATA2+, DSI_DATA2−, DSI_DATA3+, DSI_DATA3−), according to a mode command, in the normal driving mode.

The clock lane 4 is a lane through which clock signals for synchronization and reference of inputted image data DATA are transmitted. The data lanes 1 to 3 are lanes through which RGB data of the image data DATA are transmitted in a single direction. The data lane 0 is a lane through which receipt information and state information of the signal controller 40 are bi-directionally transmitted to the set controller 50. The set controller 50 can return from the sleep mode, the clock-off mode, or the deep sleep mode, to the normal driving mode, according to a change in a user event or a wake-up source.

The signal controller 40 generates an output image data signal VDT by generating and arranging gamma data indicating grayscales according to the inputted image data DATA, and transmits the generated output image data signal VDT to the data driver 30, along with a data driving control signal DCS. Further, the signal controller 40 transmits a gate driving signal GCS to the gate driver 20.

The gate driver 20 is controlled by gate driving control signals GCS, and generates gate signals that are transmitted to the gate lines G1 to Gn connected to the display panel 10. The gate driver 20 may include a shift register for sequentially generating gate signals in response to a start signal of the gate driving control signals GCS. The gate driver 20 may include a level shifter for shifting a voltage of the gate signals to a voltage level that is adequate for driving the pixels.

The data driver 30 samples the change image data signal VDT according to the data driving control signal DCS and then latches the sampled change image data signal VDT for each line, to change the latched image data signal into data voltages. The data driver 30 applies the data voltages to the pixels selected by the gate signals.

Figure 2:
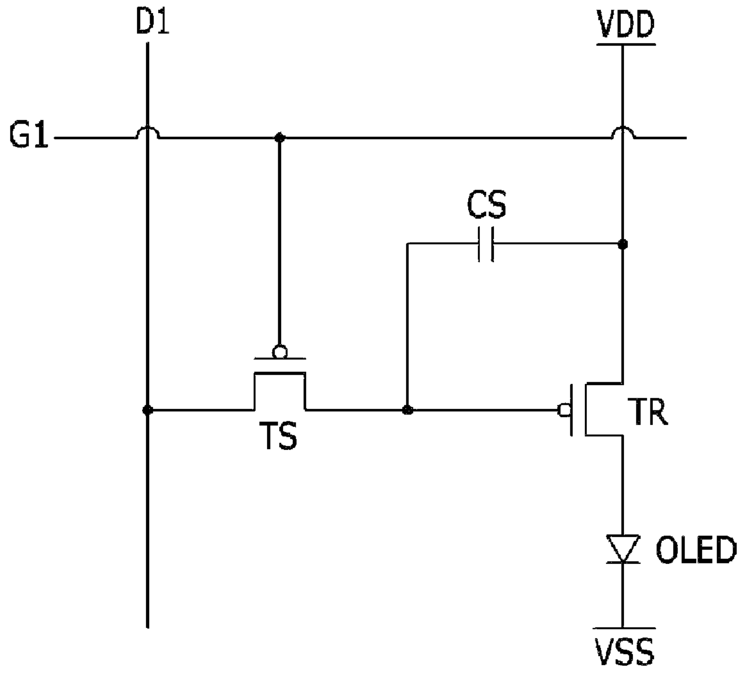
FIG. 2 shows a pixel circuit of the display device of FIG. 1.

FIG. 2 shows a pixel circuit 110 of the display panel 10. Referring to FIG. 2, the pixel circuit 110 includes a switching transistor TS, a driving transistor TR, and a storage capacitor CS. A cathode of an organic light emitting diode (OLED) is connected to a voltage VSS.

The switching transistor TS includes a gate electrode connected to a gate signal wire G1, and a first electrode and a second electrode connected to a data wire D1. The driving transistor TR includes a gate electrode connected to a second electrode of the switching transistor TS, a source electrode connected to a voltage VDD, and a drain electrode connected to an anode of the OLED. The storage capacitor CS is connected between the gate electrode of the driving transistor TR and the source electrode thereof.

When the switching transistor TS is turned on by a scan signal of a gate-on voltage transferred through the gate wire G1, the data signal is transferred to the gate electrode of the driving transistor TR through the data wire D1. A voltage caused by the data signal transferred to the gate electrode of the driving transistor TR is maintained by the storage capacitor CS.

A driving current caused by the voltage maintained by the storage capacitor CS flows in the driving transistor TR. This driving current flows into the OLED, so that the OLED emits light with a luminance according to the driving current.

Figure 3:
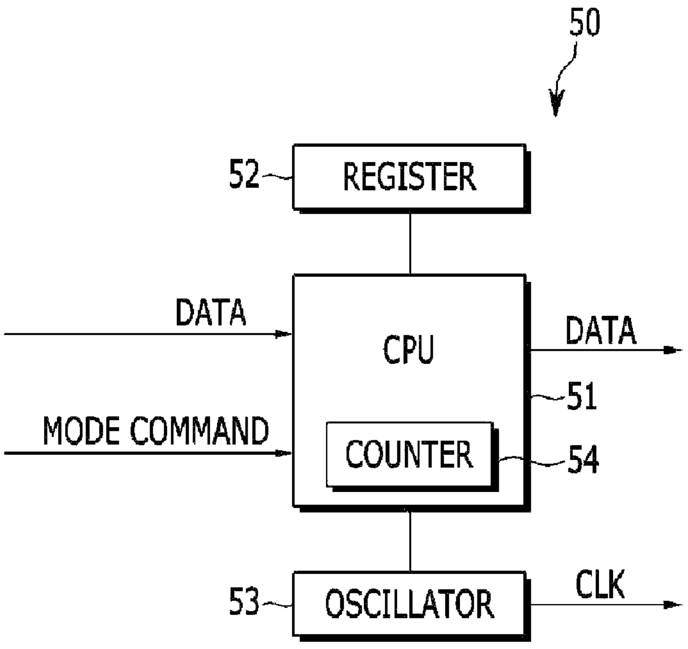
FIG. 3 shows a structure of a set controller of the display device of FIG. 1.
Figure 4:
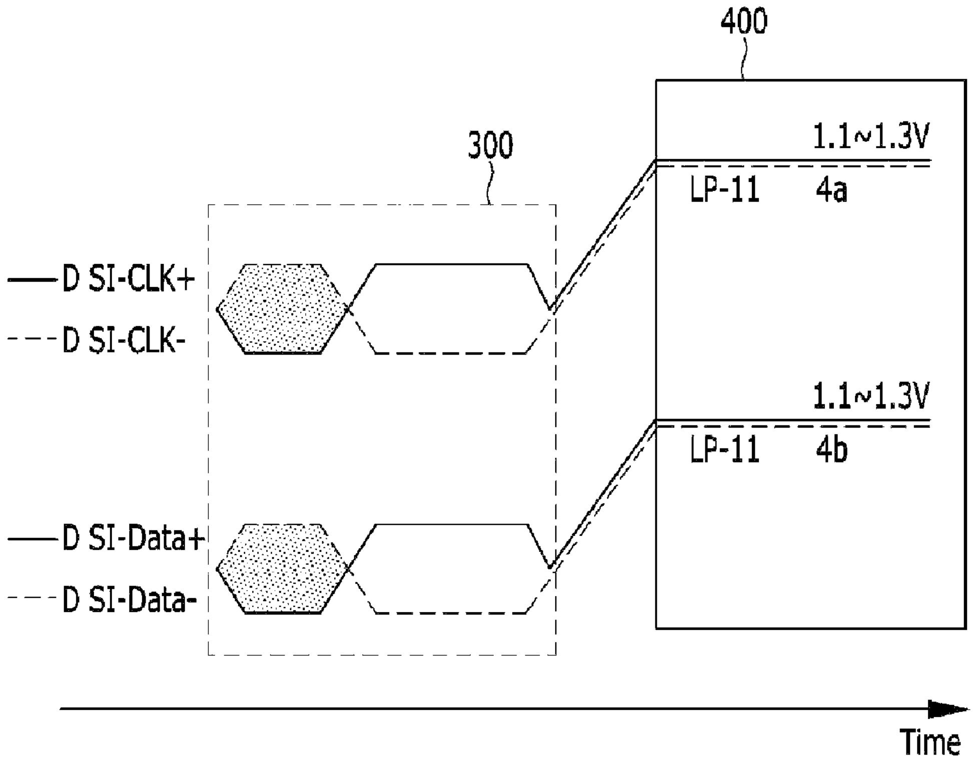
FIG. 4 shows state variations of a data lane and a DSI clock during a sleep mode.
Figure 5:
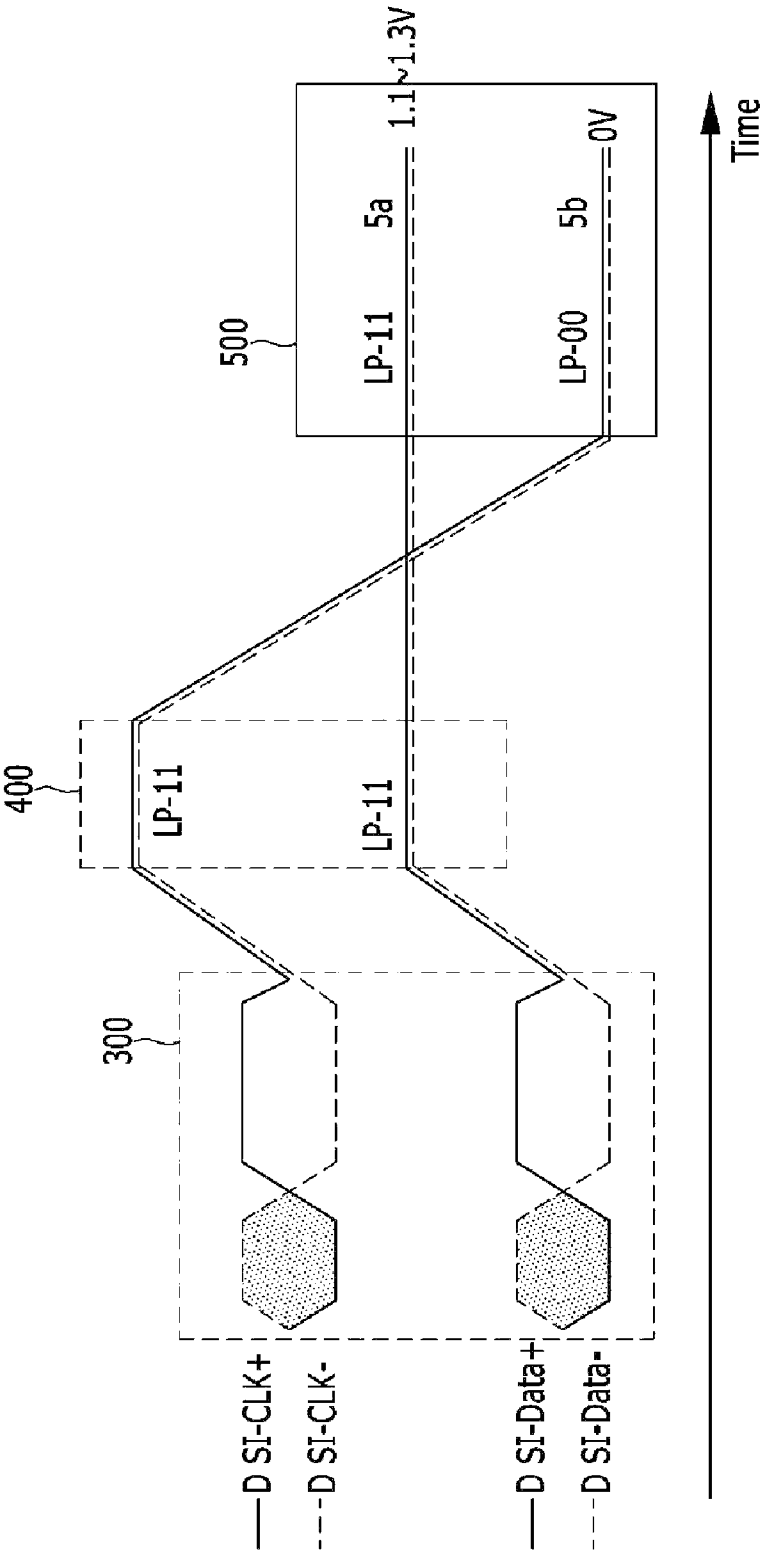
FIG. 5 shows state variations of data and a DSI clock during a clock-off mode in accordance with an exemplary embodiment of the present invention.
Figure 6:
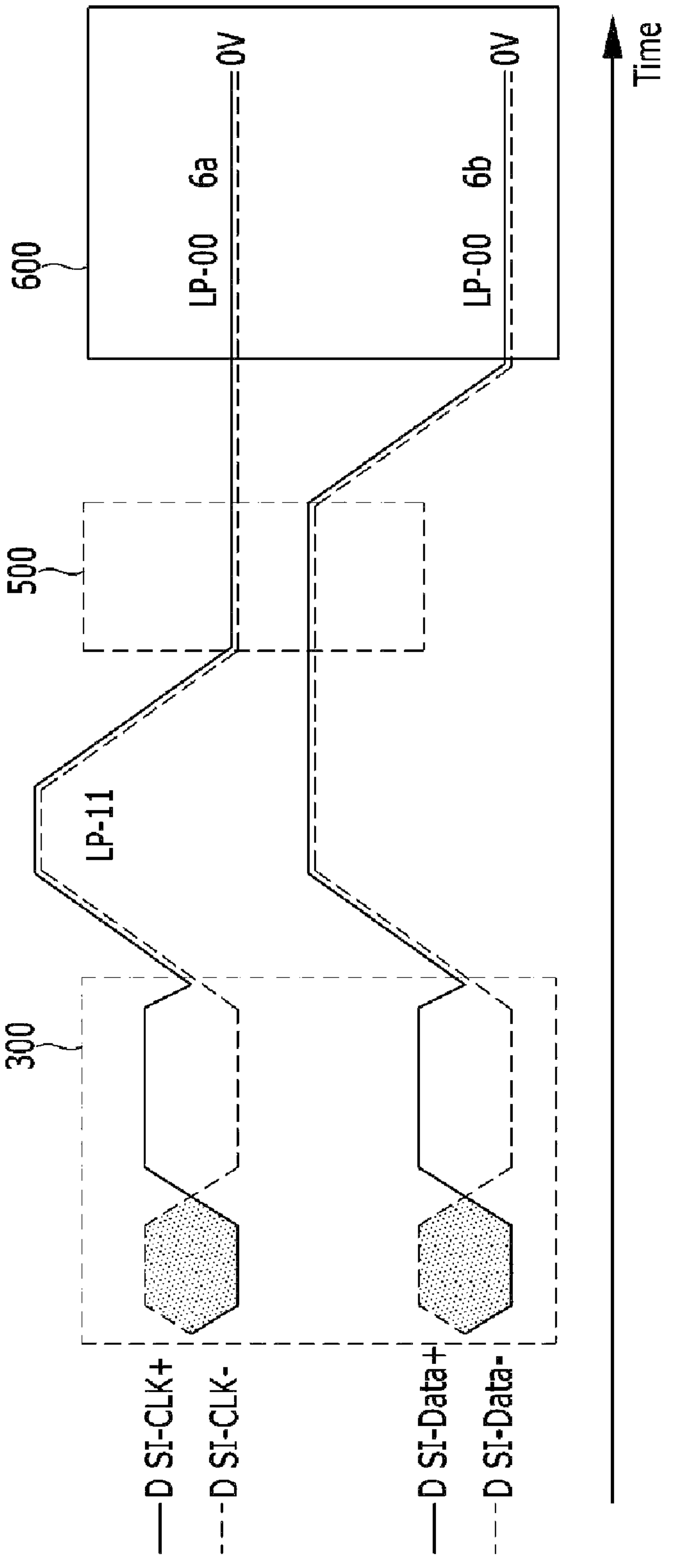
FIG. 6 shows state variations of data and the DSI clock during a deep sleep mode in accordance with an exemplary embodiment of the present invention.
Figure 10:
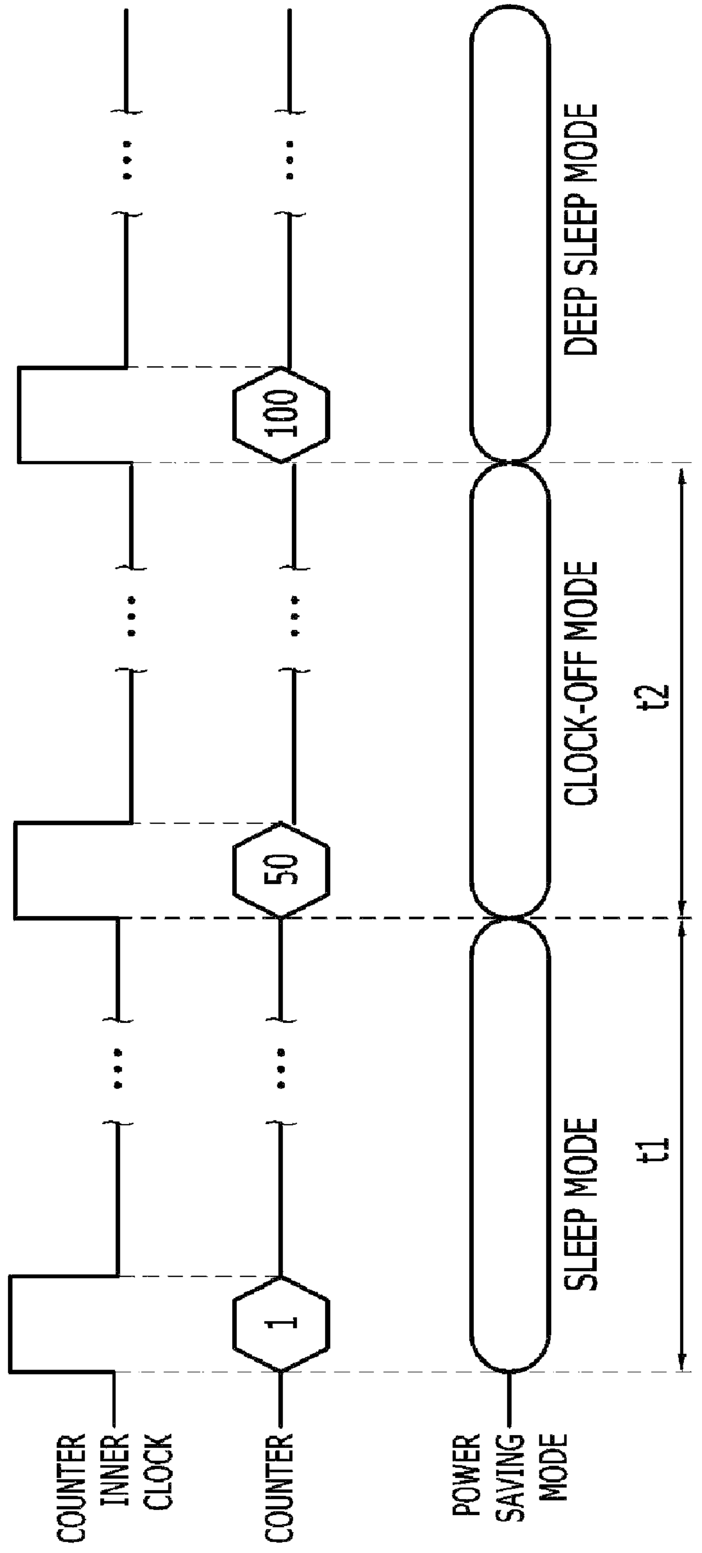
FIG. 10 shows a method of entering a clock-off mode in accordance with an exemplary embodiment of the present invention.

FIG. 3 shows a structure of a set controller in accordance with an exemplary embodiment of the present invention. FIG. 4 shows state variations of a data lane and a DSI clock of a sleep mode. FIG. 5 shows state variations of data and a DSI clock of a clock-off mode in accordance with an exemplary embodiment of the present invention. FIG. 6 shows state variations of data and the DSI clock of a deep sleep mode in accordance with an exemplary embodiment of the present invention. FIG. 7 shows a register map in accordance with an exemplary embodiment of the present invention. FIG. 8 shows a clock control register in accordance with an exemplary embodiment of the present invention. FIG. 9 shows a PLL control register in accordance with an exemplary embodiment of the present invention. FIG. 10 shows a method of entering a clock-off mode in accordance with an exemplary embodiment of the present invention.

Hereinafter, the display device of the present exemplary embodiment will be described with reference to FIG. 3 to FIG. 10. Referring to FIG. 6, once the set controller 50 switches from a clock-off mode 500 to a deep sleep mode 600, a DSI clock signal and data are maintained as LP-00 6*a* and 6*b*. In the LP-00, voltage levels of the clock signal and the data is become 0 V, which may reduce power consumption of the set controller 50 and a driver IC (gate driver 20, data driver 30, and/or signal controller 40).

In the present exemplary embodiment, the set controller 50 includes a CPU 51, a register 52, and an oscillator 53. The oscillator 53 includes a phase-locked loop (PLL) controlled according to values of the register 52, and transmits a clock signal CLK to the signal controller 40. The values of the register 52 are adjusted by the CPU 51.

Referring to a register map of the register 52 shown in FIG. 7, the register 52 includes a DSIM_CLKCTRL register which is involved in clock control, and a DSIM_PLLCTRL register which controls the PLL of the oscillator 53.

Referring to FIG. 8, the DSIM_CLTR register includes lower registers. A bit data bit for controlling a clock transmitting operation of the oscillator 53 is stored in a lower register ByteClkEn. An initial value of the bit stored in the lower register ByteClkEn is 0, and the oscillator 53 is turned on to transmit the clock signals when the lower register ByteClkEn has a value of 0, and is turned off to transmit no clock signal when the lower register ByteClkEn has a value of 1.

Referring to FIG. 9, the DSIM_PLLCLTR register includes lower registers. A bit data bit for controlling an operation of the PLL is stored in the lower register PllEn. An initial value of the bit stored in the lower register PllEn is 0, and the PLL is turned on when the lower register PllEn has a value of 0 and is turned off when the lower register PllEn has a value of 1.

The CPU 51 adjusts the values of the lower registers ByteClkEn and PllEn to 0 or 1. The CPU 51 controls the clock signal transmitting operation of the oscillator 53 and the operation of the PLL in the sleep mode, the clock-off mode, and the deep sleep mode, according to the adjusted values of the lower registers. When no sleep mode command or no user event is inputted during a normal driving mode 300, the CPU 51 adjusts the values of the lower registers ByteClkEn and PllEn to 0, so as to enter a sleep mode 400.

Referring to FIG. 4, in the sleep mode 400, a voltage level of the clock signal (DSI-CLK+, DSI-CLK−) is maintained to LP-11 (1.1-1.3 V, 4*a*), and a voltage level of the data (DSI-DATA+, DSI-DATA−) is maintained to LP-11 (1.1-1.3 V, 4*b*). In this case, the CPU 51 returns to the normal driving mode 300 when the user event or the wake-up source is changed in the sleep mode 400.

When the sleep mode 400 is maintained to exceed a predetermined first reference time period or no user event is inputted, or a clock-off mode command is inputted, the CPU 51 adjusts the values of the lower registers ByteClkEn and PllEn to 0, so as to enter the clock-off mode 500.

Referring to FIG. 5, in the clock-off mode 500, the voltage level of clock signal (DSI-CLK+, DSI-CLK−) is maintained to LP-00 (0 V, 5*b*) by the adjusted values of the lower registers ByteClkEn and PllEn, so that the oscillator 53 and the PLL are turned off and the voltage level of the DSI data (DSI-DATA+, DSI-DATA−) is maintained to LP-11 (1.1-1.3 V, 5*a*). Accordingly, it is possible to minimize the power consumption of the oscillator 53 by deactivating the oscillator 53. The CPU 51 returns to the normal driving mode 300, when the user event is generated or the wake-up source is changed in the clock-off mode 500.

When the clock-off mode 500 is maintained for longer than a predetermined second reference time period, no user event is inputted, or a deep sleep mode command is received, the CPU 51 enters the deep sleep mode 600. In the deep sleep mode 600, the values of the lower registers ByteClkEn and PllEn are maintained at 1.

Referring to FIG. 6, in the deep sleep mode 600, the voltage levels of the DSI is clock and the data are maintained at LP-00 (0V, 6*a* and 6*b*). In this case, the CPU 51 returns to the normal driving mode 300 when the user event is generated or the wake-up source is changed in the deep sleep mode 600.

The CU 51 may include a counter 54 for measuring the passage of time by counting the clock signals. The counter 54 measures a sleep mode time period from a point of time at which the sleep mode 400 is started and a clock-off mode time period from a point of time at which the clock-off mode 500 is started, by using the clock signals generated.

The CPU 51 enters the clock-off mode 500 when the sleep mode time period measured in the counter 54 exceeds the first reference time period, or no user event is inputted for the first reference time period. The CPU 51 maintains the sleep mode 400 when the sleep mode time period is equal to or smaller than the first reference time period.

The CPU 51 enters the deep sleep mode 600 when the sleep mode time period measured in the counter 54 exceeds the second reference time period, or no user event is inputted for the second reference time period, and maintains the deep sleep mode 600 when the sleep mode time period is equal to or smaller than the second reference time period. The CPU 51 returns to the normal driving mode 300 when the user event or the wake-up source is changed during the first reference time period or the second reference time period.

Referring to FIG. 10, the first reference time period t1 is set as 50 seconds, and the second reference time period t2 is set as 100 seconds. When the sleep mode is started, the counter 54 counts the sleep mode time. When the sleep mode time period reaches 50 seconds, the CPU 51 enters the clock-off mode. When 50 seconds have passed after the CPU 51 enters the clock-off mode, the CPU 51 enters the deep sleep mode. When the CPU 51 enters the deep sleep mode, the count value is initialized to 0.

The CPU 51 may be configured to adjust the first and second reference time periods. The CPU 51 may also be configured to adjust the voltages of the clock signal and the data signal.

Figure 11:
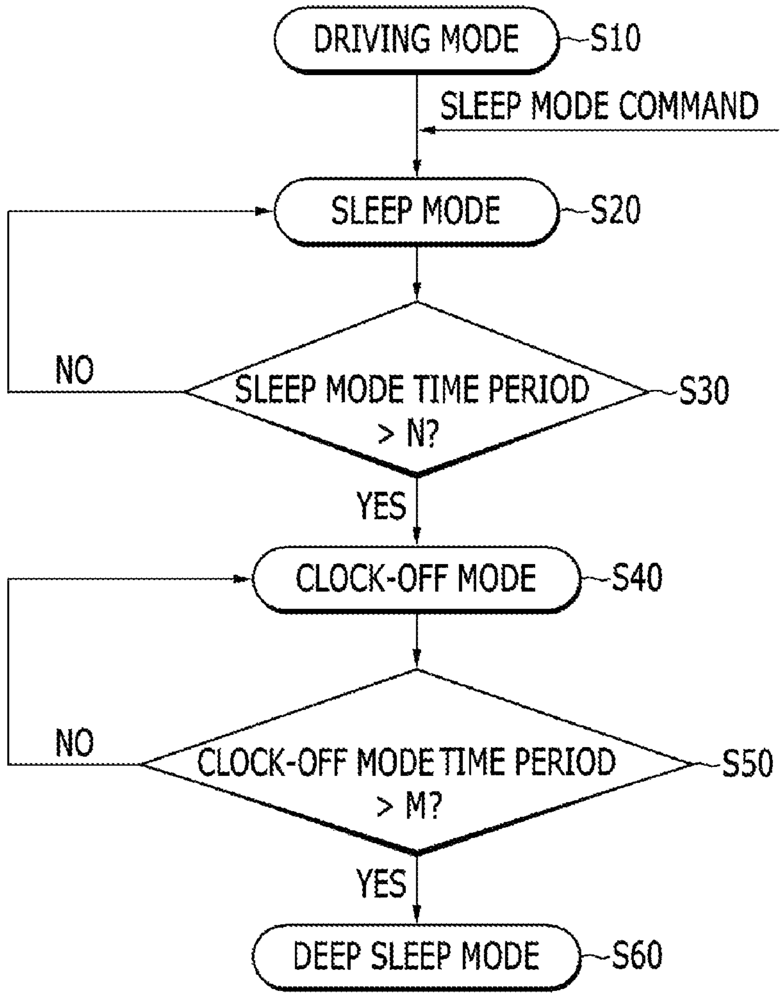
FIG. 11 is a flowchart showing a method of entering a power saving mode in accordance with an exemplary embodiment of the present invention.

FIG. 11 is a flowchart showing a method of entering a power saving mode, in accordance with an exemplary embodiment of the present invention. Referring to FIG. 11, an output image is displayed on the display panel 10 according to the output image data signal VDT, in operation S10 (normal driving mode). In operation S20 (sleep mode), the CPU 51 maintains the voltage levels of image data and clock signals transmitted from the set controller 50 to the display device according to the sleep mode command, at a first voltage (e.g., 1.1 to 1.3 V).

In operation S30, the CPU 51 determines whether to return to operation S20 or proceed to operation S40. The CPU proceeds to operation S40 when the sleep mode time period (measured from when the sleep mode is started) exceeds a first reference time period N. The CPU 51 and returns to the normal driving mode when the user event is generated or the wake-up source is changed. The CPU 51 adjusts a register value of the set controller 50 and maintains a clock signal according to the register value in operation S40 (clock-off mode step).

In operation S50, the CPU 51 determines wither to return to operation S40 or proceed to operation S60. The CPU 51 proceeds to operation S60 when the clock-off mode time period (measured from when the clock-off mode is started) exceeds a second reference time period M. The CPU 51 returns to the normal driving mode when the user event is generated or the wake-up source is changed.

The voltage levels of the image data and the clocks are maintained at a second voltage (e.g., 0 V) during operation S60 (deep sleep mode). In the deep sleep mode, the CPU 51 is returns to the normal driving mode when the user event is generated or the wake-up source is changed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, although the set controller 50 and the signal controller 40 have been described as individual units in the exemplary embodiment, the set controller 50 and the signal controller 40 may be integrally provided as a single unit.

What is claimed is:

1. A method of reducing power consumption in a display device comprising a display panel and a set controller, the method comprising:

operating the set controller in a normal driving mode to display an image on the display panel, by outputting a clock signal and an image data signal;

operating the set controller in a sleep mode when a sleep mode command is received, by adjusting the clock signal and the image data signal to a first voltage;

measuring a sleep mode time period during which the controller operates in the sleep mode; and operating the set controller in a clock-off mode when the measured sleep mode time period exceeds a first reference time period, by adjusting the clock signal to a second voltage, while maintaining the image data signal at the first voltage, wherein the second voltage is lower than the first voltage, and the second voltage is applied to a clock lane in the clock-off mode.

2. The method of claim 1, further comprising:

measuring a clock-off mode time period during which the controller operates in the clock-off mode; and operating the set controller in a deep sleep mode by maintaining the clock signal at the second voltage and adjusting the image data signal to the second voltage, when the measured clock-off mode time period exceeds a second reference time period.

3. The method of claim 2, wherein the set controller operates in the clock-off mode if the measured clock-off mode time period does not exceed the second reference time.

4. The method of claim 1, wherein the set controller operates in the sleep mode if the measured sleep mode time period does not exceed the first reference time.

5. The method of claim 1, wherein:

the first voltage is 1.1-1.3 V; and the second voltage is 0 V.

6. A power-consumption reducing display device, comprising:

a set controller configured to selectively operate in a sleep mode, a clock-off mode, and a deep sleep mode, by adjusting voltages applied to a clock lane and a data lane by the set controller;

a signal controller configured to generate an image data signal according to the voltages applied to the data lane;

a data driver configured to receive the image data signal and generate a data voltage corresponding to the image data signal, in response to a gate signal; and a display panel configured to receive the data voltage and display a corresponding image, wherein the set controller is configured to apply a first voltage to the clock lane and the data lane in the sleep mode, the set controller is configured to apply the first voltage to the data lane and a second voltage to the clock lane in the clock-off mode, and the second voltage is lower than the first voltage.

7. The device of claim 6, wherein the set controller comprises:

an oscillator configured to transmit a clock signal to the signal controller;

a register configured to store a register value and control the oscillator according to the stored register value; and a central processing unit (CPU) configured to adjust the stored register value according to the mode of the set controller, to control the oscillator.

8. The device of claim 7, wherein:

the set controller is configured to operate in the clock-off mode when a clock-off mode command is received or when the set controller operates in the sleep mode for a time period longer than a first reference time period; and when the set controller operates in the clock-off mode, the CPU is configured to turn off the oscillator by adjusting the register value, and apply the first voltage to the data lane.

9. The device of claim 8, wherein the CPU comprises a counter configured to measure a sleep mode time period during which the set controller operates in the sleep mode, and measure a clock-off mode time period during which the set controller operates in the clock-off mode.

10. The device of claim 7, wherein, the set controller is configured to operate in the deep sleep mode when a deep sleep mode command is received or the set controller operates in the clock-off mode for longer than a second reference time; and when the set controller operates in the deep sleep mode, the CPU is configured to apply the second voltage to the clock lane and the data lane.

11. The device of claim 10, wherein:

the set controller is configured to operate in the clock-off mode when the sleep mode time period exceeds a first reference time period; and the set controller is configured to operate in the deep sleep mode when the clock-off mode time period exceeds a second reference time period.

12. The device of claim 6, wherein the set controller is configured to:

apply a 0 voltage to the data lane and the clock lane when in the deep sleep mode.

* * * * *